United States Patent [19]
Schmidt

[11] Patent Number: 4,981,431
[45] Date of Patent: Jan. 1, 1991

[54] INJECTION MOLDING SYSTEM WITH FLANGED INSULATING GATE SEAL

[75] Inventor: Harald H. Schmidt, Georgetown, Canada

[73] Assignee: Mold-Masters Limited, Georgetown, Canada

[21] Appl. No.: 399,972

[22] Filed: Aug. 29, 1989

[30] Foreign Application Priority Data

Jul. 13, 1989 [CA] Canada ................................. 605616

[51] Int. Cl.⁵ ............................................. B29C 45/20
[52] U.S. Cl. ................................... 425/549; 264/297.2;
264/328.8; 264/328.15; 425/568; 425/572;
425/588
[58] Field of Search ............. 264/328.8, 328.9, 328.15,
264/297.2; 425/549, 566, 567, 568, 570, 572,
588

[56] References Cited

U.S. PATENT DOCUMENTS

| | | | |
|---|---|---|---|
| 4,043,740 | 8/1977 | Gellert | 425/567 |
| 4,094,447 | 6/1978 | Gellert | 425/570 |
| 4,344,750 | 8/1982 | Gellert | 425/549 |
| 4,688,622 | 8/1987 | Gellert | 164/61 |
| 4,768,283 | 9/1988 | Gellert | 425/549 |
| 4,793,795 | 12/1988 | Schmidt et al. | 264/328.15 |
| 4,854,851 | 8/1989 | Gellert | 425/549 |

Primary Examiner—Timothy Heitbrink
Attorney, Agent, or Firm—Riches, McKenzie & Herbert

[57] ABSTRACT

An injection molding system having at least one insulation gate seal extending outwardly to bridge an insulative air space between a heated nozzle and the adjacent cooled cavity plate. Each seal has a central bore therethrough to convey pressurized melt from the nozzle to the aligned gate. The outer end of each seal has a circular groove extending between a central portion and a surrounding flange portion. The flange portion is substantially larger in diameter than the gate and extends outwardly past the face of the central portion into sealing contact around the gate against the surrounding surface of the cavity plate. The combination of the clearance provided between the face of the central portion and the surrounding surface of the cavity plate and the distance between the gate and the surrounding flange portion limits the temperature of the cavity plate immediately around the gate, while still providing the necessary seal.

17 Claims, 3 Drawing Sheets

INJECTION MOLDING SYSTEM WITH FLANGED INSULATING GATE SEAL

This invention relates generally to injection molding and more particularly to an injection molding system having a hollow insulation seal seated in alignment with the gate.

Injection molding systems having a heated nozzle seated in a cooled cavity plate with an insulative air space between them are well known in the art, and it is also well known to bridge the air space between them by a nozzle seal or gate insert to prevent leakage of the melt. Examples are shown in U.S. Pat. No. 4,043,740 to Gellert which issued Aug. 23, 1977 and the applicant's Canadian patent application Ser. No. 578,974 filed Sept. 30, 1988 entitled "Injection Molding Nozzle with Replaceable Gate Insert". Edge gated injection molding is also known, as shown in U.S. Pat. No. 4,094,447 to Gellert which issued Jun. 13, 1978. An edge gated system having hollow seals extending radially around each gate is shown in U.S. Pat. No. 4,344,750 to Gellert which issued Aug. 17, 1982. While this arrangement works very well for many applications, in some instances the seals provide excessive heat adjacent the gate which reduces cycle frequency.

SUMMARY OF THE INVENTION

Accordingly, it is an object of the present invention to at least partially overcome the disadvantages of the prior art by providing an injection molding system with an insulation seal which reduces heat transfer to the immediate area of the gate.

To this end, in one of its aspects, the invention provides an injection molding system having an elongated heated nozzle with a forward end and a rear end seated in a well having an inner surface in a cooled cavity plate with minimal contact bridging an insulative air space extending between the heated nozzle and the surrounding cooled cavity plate, the nozzle having a melt passage extending therethrough to convey pressurized melt to at least one gate extending through the cavity plate to a cavity, the improvement comprising a hollow seal having a central bore extending therethrough from an inner end to an outer end, the outer end having a central portion surrounded by a flange portion which projects outwardly a predetermined distance past the central portion and is substantially larger in diameter than the said one gate, the inner end of the seal being seated in the nozzle in a position wherein the seal bridges the insulative air space with the central bore through the seal in alignment with at least a portion of the melt passage and the said one gate, and the flange portion extends into contact against the inner surface of the well around the said one gate whereby a predetermined insulation space is provided between the central portion of the outer end of the seal and the inner surface of the well.

Further objects and advantages of the invention will appear from the following description taken together with the accompanying drawings.

DETAILED DESCRIPTION OF THE DRAWINGS

Figure 1:
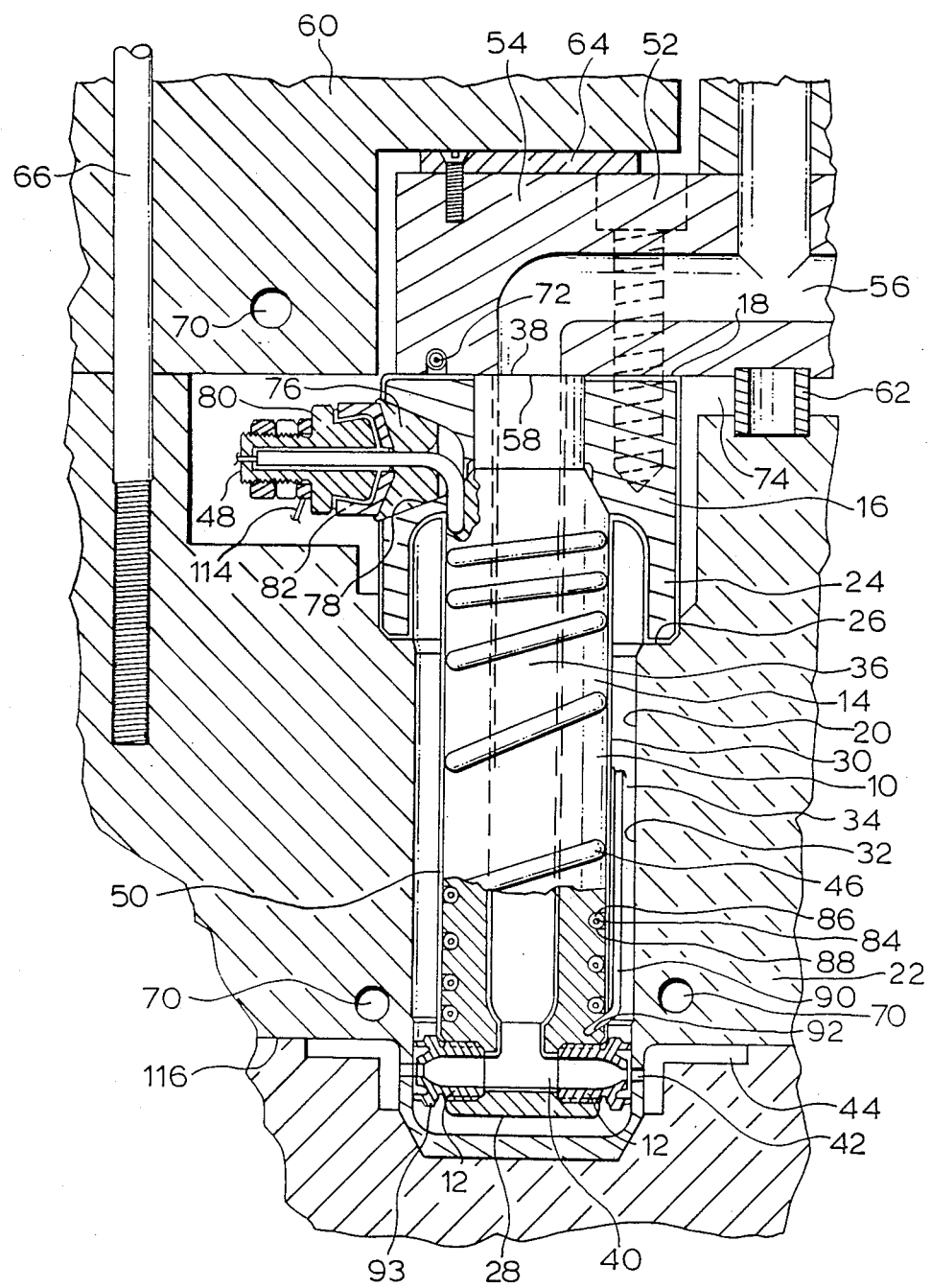
FIG. 1 is a sectional view of a portion of an edge gated injection molding system according to one embodiment of the invention.

Reference is first made to FIG. 1 which shows a portion of an edge gated injection molding system having a number of heated nozzles 10, each with a number of edge gate seals 12 according to a preferred embodiment of the invention. Each nozzle 10 has a steel main body portion 14 extending from a steel collar portion 16 adjacent the rear end 18. The nozzle 10 is seated in a well 20 in the cavity plate 22 by a circumferential insulation flange 24 which extends from the collar portion 16 and sits on a circumferential shoulder 26. The nozzle has a forward end 28, adjacent which the edge gate seals 12 are seated, as described in more detail below. In this position, the cylindrical outer surface 30 of the main body portion 14 of the nozzle 10 is separated from the inner surface 32 of the well 20 in the surrounding cavity plate 22 by an insulative air space 34. The nozzle 10 has a melt passage with a central portion 36 which extends from an inlet 38 at the rear end 18 and branches into a number of radial portions 40, each of which extends outwardly in alignment with one of the edge gates 42 extending radially outward through the cavity plate 22 to one of the cavities 44.

The nozzle is heated by an electrically insulated heating element 46 which is integrally brazed in a spiral channel in the outer surface 30 of the main body portion 14 and extends to the terminal 48 which projects outwardly or frontwardly from the collar portion 16. The heating element 46 in the channel is covered by a protective nickel casting 50 which is applied as described in U.S. Pat. No. 4,768,283 to Gellert which issued Sept. 6, 1988.

The nozzles 10 are secured by bolts 52 to a common elongated manifold 54 which has a melt passage 56 which branches to a number of outlets 58, each of which is aligned with the inlet 38 to the melt passage through one of the nozzles 10. The manifold 54 is located securely in place between a back plate 60 and the cavity plate 22 by a central locating ring 62 and a titanium pressure pad 64. The back plate 60 is held in place by bolts 66 which extend into the cavity plate 22. The back plate 60 and the cavity plate 22 are cooled by pumping cooling water through cooling conduits 70. The manifold 54 is heated by an electric heating element 72 which is cast into it as described in U.S. Pat. No. 4,688,622 entitled "Injection Molding Manifold Member and Method of Manufacture" to Gellert which issued Aug. 25, 1987. The locating ring 62 bridges another insulative air space 74 provided between the heated manifold 54 and the cavity plate 22.

The rear end of the heating element 46 extends radially outward through a plug 76 which is secured in a radial opening 78 through the collar portion 16 of the nozzle 10. The terminal 48 is provided by a terminal body 80 which has a protective cap 82 secured to it as described in detail in Gellert's Canadian patent application Ser. No. 578,975 filed Sept. 30, 1988 entitled "Method of Manufacture of an Electrical Terminal on an Injection Molding Nozzle". The heating element 46 has a nickel chrome resistance wire 84 extending centrally through a refractory powder electrical insulating material 86 such as magnesium oxide inside a steel casting 88.

A thermocouple 90 extends into a diagonal thermocouple bore 92 to measure the operating temperature adjacent the forward end 28 of the nozzle 10.

Figure 2:
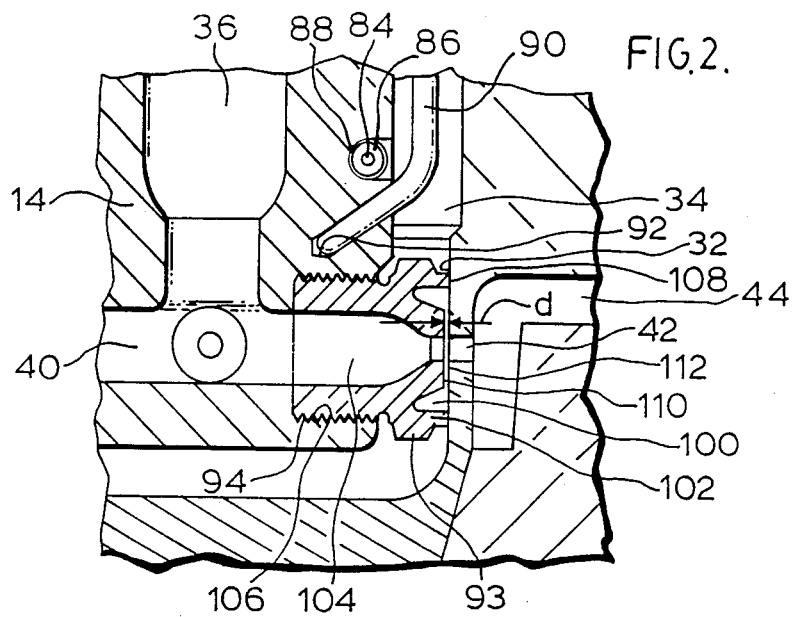
FIG. 2 is an enlarged view showing on of the edge gate seals.
Figure 3:
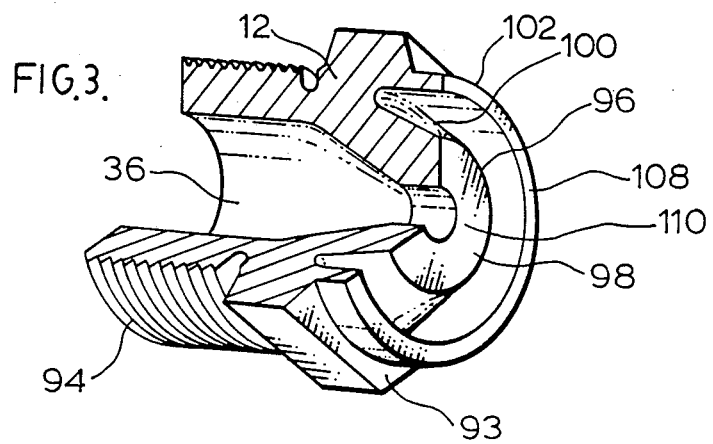
FIG. 3 is a cut-away isometric view of the edge gate seal seen in FIG. 2.
Figure 4:
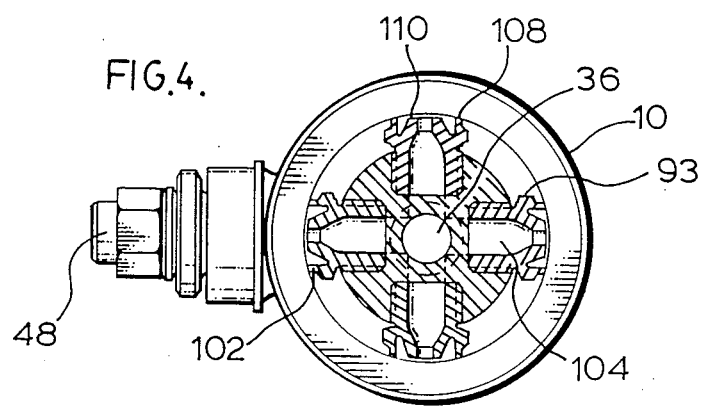
FIG. 4 is a cross-sectional view of the same seal.

As more clearly seen in FIGS. 2 and 3, each edge gate seal 12 has a hexagonal portion 93 extending between a threaded inner end 94 and an outer end 96 with a central portion 98 surrounded by a circular groove 100 and a circular outer flange portion 102. The seal 12 has a central bore 104 extending therethrough which smoothly tapers from a larger diameter at the inner end 94 which matches the diameter of the radial portion 40 of the nozzle melt passage to a smaller diameter at the outer end 96 which approximates the diameter of the edge gate 42. After the seal 12 is screwed securely into place in a seat 106 adjacent the forward end 28 of the nozzle 10, the outer face 108 of the flange portion 102 are ground to match the inner surface 32 of the well 20 in the cavity plate 22. After installation in the well 20, each seal bridges the insulative air space 34 and the central bore provides an extension of the radial portion 40 of the nozzle melt passage in alignment with the gate 42. When the nozzle 10 is heated to the operating temperature, the flange portion 102 expands into bearing contact against the inner surface 32 of the well 20 in the cavity plate 22. As clearly seen in FIG. 2, the flange portion 102 extends outwardly a predetermined distance past the face 110 of the central portion to provide a clearance "d" between the face 110 and the inner surface 32 of the well 20. Thus, an insulation space 112 is formed between the central portion 98 of the outer end 96 of each seal 12 and the inner surface 32 of the well 20. This space 112 fills with melt, but the sealing contact of the surrounding flange portion 102 against the inner surface 32 of the well 20 prevents the melt escaping into the insulative air space 34.

In use, the system is assembled as shown in FIG. 1 by screwing the edge gate seals 12 into place in the nozzles 10 using the hexagonal portions 93. Electrical power is applied through the lead 114 to the terminal 48 of the heating element 46 of each nozzle 10 and to the heating element 72 in the manifold 54 to heat the nozzles and the manifold to a predetermined operating temperature. Pressurized melt from a molding machine (not shown) is injected into the melt passage 56 through the manifold 54 according to a predetermined molding cycle in a conventional manner. The pressurized melt flows through the central portion 36 of the melt passage through each nozzle 10 and branches out through each radial portion 40 to the central bore 104 of the aligned seal 12. The melt fills the insulation space 112 between the outer end 96 of the seal and the inner surface 32 and flows through the aligned edge gate 42 and fills the cavity 44. As mentioned above, the flange portion 102 of the outer end 96 of the edge gate seal 12 bears against the inner surface 32 of the well around the gate 42 to provide the necessary seal against the leakage of melt. However, the combination of the provision of the insulation space 112 between the face 110 and the inner surface 32 and the fact that the flange portion 102 is substantially larger in diameter than the gate 42 distances the necessary sealing contact between the heat seal 12 and the cooled cavity plate 22 from the immediate gate area. Thus, the temperature of the cavity plate 22 around the gate 42 is limited without requiring excessive cooling to the cavity plate 22. The clearance "d" and the diameter of the flange portion 102 can be varied depending upon the size of the gate 42 and the gate temperatures required for the particular material to be molded by the system. In this embodiment, the circular groove 100 is provided between the face 110 of the central portion 98 and the surrounding flange portion 102 of each seal to further reduce heat transfer through the relatively thin flange portion 102 to the cooled cavity pate 22. Conductivity is further reduced by making the seals 12 of a titanium alloy. After the cavities are filled, injection pressure is held momentarily to pack and then released. After a short cooling period, the mold is opened along the parting line 116 to eject the molded products. After ejection the mold is closed and injection pressure is reapplied to refill the cavities 44. This cycle is repeated continuously with a frequency dependent on the size and shape of the cavities and the type of material being molded.

Figure 5:
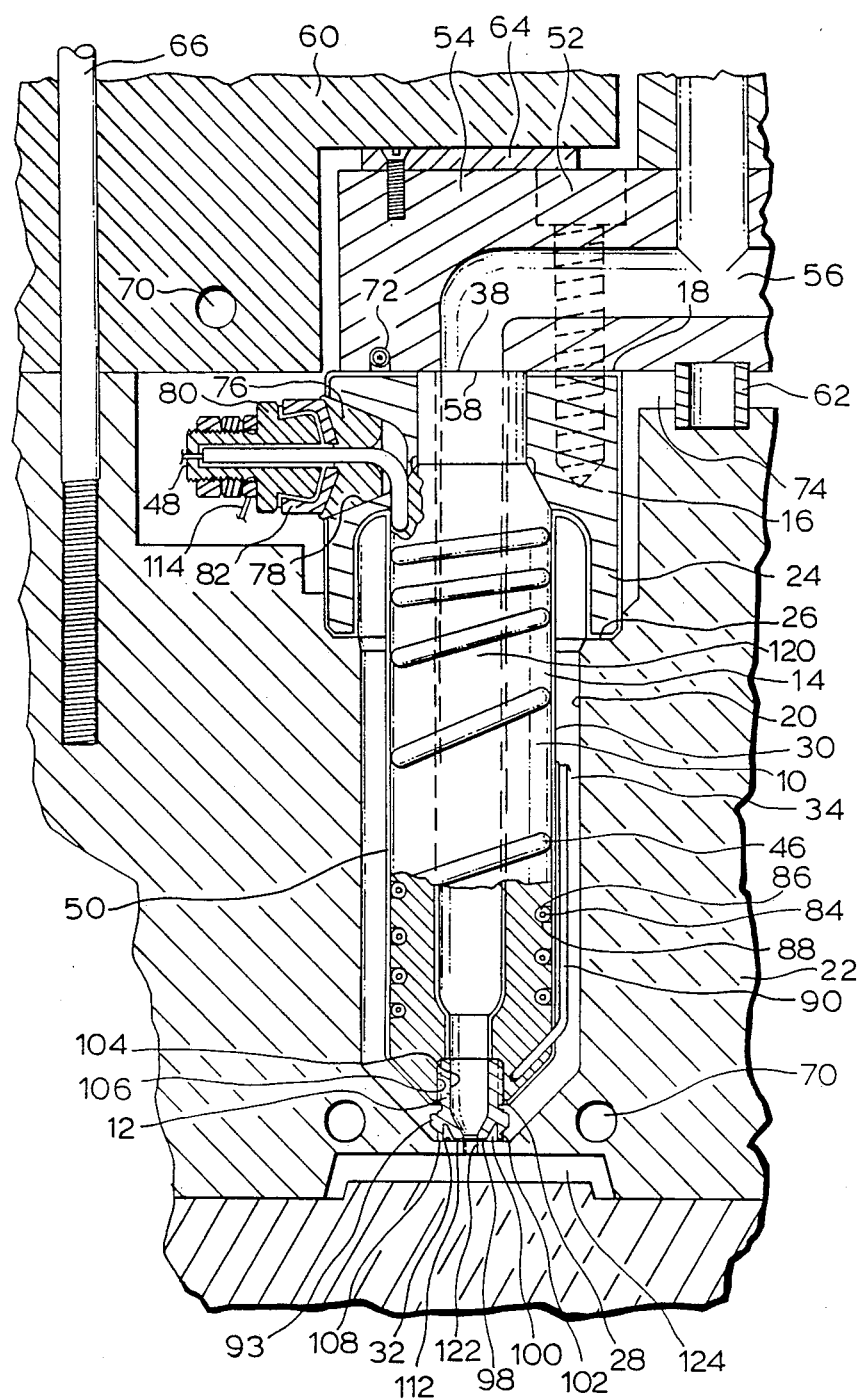
FIG. 5 is a sectional view of a portion of a center gated injection molding system according to another embodiment of the invention.

Reference is now made to FIG. 5 which shows an injection molding system according to another embodiment of the invention. As most of the elements of the system are similar to those of the first embodiment described above, elements common to both embodiments are described and illustrated using the same reference numerals. In this embodiment, each heated nozzle 10 has a melt passage 120 which extends centrally from the inlet 38 in alignment with a center gate 122 extending through the cavity plate 22 to a single cavity 124. The insulation gate seal 12 is the same as those described above, except it is screwed into a seat 106 in the forward end 28 of the nozzle 10 where the central bore 104 is an alignment with the melt passage 120 and the center gate 122. The flange portion 102 of the seal 12 is substantially larger in diameter than the center gate 122 and the outer face 108 of the flange portion 102 is in bearing contact against the inner surface 32 of the well 20 around the gate 122. The center gate seal 12 similarly has a circular groove 100 extending around a recessed central portion 98 which provides an insulation space 112 between the central portion 98 and the inner surface 32 of the well 20. The operation of this embodiment of the invention is essentially the same as that described above and the description need not be repeated.

While the description of the injection molding system with a flanged insulation gate seal has been given with respect to preferred embodiments, it is not to be construed in a limiting sense. Variations and modifications will occur to those skilled in the art. For instance, the inner end 94 may not be threaded but may just be tightly received in the seat 106. Reference is made to the appended claims for a definition of the invention.

What I claim is:

1. In an injection molding apparatus having an elongated heated nozzle with a forward end and a rear end, said heated nozzle seated in a well of surrounding cooled cavity plate, an insulative air space extending between the heated nozzle and the surrounding cooled cavity plate, the heated nozzle having a melt passage extending therethrough to convey pressurized melt to a gate extending through the cavity plate to a cavity, the improvement comprising:

a hollow seal having a central bore extending therethrough from an inner end of the seal to an outer end of the seal, the outer end having a central portion surrounded by a flange portion which projects outwardly a predetermined distance past the central portion and is substantially larger in diameter than said gate, the inner end of the seal being seated in the nozzle in a position wherein the seal bridges the insulative air space wherein the central bore through the seal is in alignment with at least a portion of the melt passage and said gate, and the flange portion extends into contact against an inner surface of the well around said gate whereby a predetermined insulation space is provided between the central portion of the outer end of the seal and the inner surface of the well.

2. An injection molding apparatus as claimed in claim 1 wherein said gate is an edge gate extending radially outward through the cavity plate, the melt passage has a first portion extending centrally from an inlet at the rear end of the nozzle and a second portion extending radially outward from the first portion adjacent the forward end of the nozzle in alignment with said edge gate, and the seal is an edge gate seal with the central bore therethrough in alignment with said second potion of the melt passage and the edge gate seal.

3. An injection molding apparatus as claimed in claim 2, wherein the melt passage through the nozzle has a plurality of radially spaced second portions extending outwardly from the first central portion, each second portion extending to a separate edge gate seal seated in alignment with a separate edge gate.

4. An injection molding apparatus as claimed in claim 3, wherein each edge gate seal has a circular groove extending between the central portion of the outer end of the seal and the surrounding flange portion.

5. An injection molding apparatus as claimed in claim 4, wherein the flange portion of each edge gate seal has an outer face which is machined to match the inner surface of the well in the cavity plate.

6. An injection molding apparatus as claimed in claim 5, wherein the central bore through each edge gate seal smoothly tapers from a first diameter which matches the aligned raidial portion of the melt passage through the nozzle to a second diameter which is smaller than the first diameter and which approximates the aligned gate.

7. An injection molding apparatus as claimed in claim 6, wherein the inner end of each edge gate seal is threaded to be securely removably received in a radial seat adjacent the forward end of the nozzle.

8. An injection molding apparatus as claimed in claim 7, wherein each edge gate seal has an engageable nut-shaped portion for assembly and disassembly.

9. An injection molding apparatus as claimed in claim 8, wherein the flange portion of the outer end of each edge gate seal is thin.

10. An injection molding apparatus as claimed in claim 9, wherein the edge gate seals are formed of a titanium alloy.

11. An injection molding apparatus as claimed in claim 1, wherein the melt passage extends centrally through the nozzle from an inlet at the rear end of the nozzle, said gate being a center gate extending through the cavity plate in alignment with the melt passage, and the seal is a center gate seal with the central bore therethrough in alignment with the melt passage and the center gate.

12. An injection molding apparatus as claimed in claim 11, wherein the center gate seal has a circular groove extending between the central portion of the outer end of the seal and the surrounding flange portion.

13. An injection molding apparatus as claimed in claim 12, wherein the central bore through the center gate seal smoothly tapers from a first diameter which matches the aligned melt passage through the nozzle to a second diameter which is smaller than the first diameter and approximates the aligned gate.

14. An injection molding apparatus as claimed in claim 13, wherein the inner end of each center gate seal is threaded to be securely removably received in a seat at the forward end of the nozzle.

15. An injection molding apparatus as claimed in claim 14, wherein the center gate seal has an engageable nut-shaped portion for assembly and disassembly.

16. An injection molding apparatus as claimed in claim 15, wherein the flange portion of the outer end of the center gate seal is thin.

17. An injection molding apparatus as claimed in claim 16, wherein the center gate seal is formed of a titanium alloy.

* * * * *